United States Patent
Edwards

(10) Patent No.: US 9,643,338 B2
(45) Date of Patent: May 9, 2017

(54) DYNAMIC COOLING

(71) Applicant: HEXPOL HOLDING INC., Burton, OH (US)

(72) Inventor: Daniel C. Edwards, Evergreen, CO (US)

(73) Assignee: HEXPOL HOLDING INC., Burton, OH (US)

( * ) Notice: Subject to any disclaimer, the term of this patent is extended or adjusted under 35 U.S.C. 154(b) by 874 days.

(21) Appl. No.: 13/706,780

(22) Filed: Dec. 6, 2012

(65) Prior Publication Data

US 2014/0160878 A1    Jun. 12, 2014

(51) Int. Cl.
*B29B 7/82* (2006.01)
*B29B 7/18* (2006.01)
*B29B 7/24* (2006.01)
*B29B 7/26* (2006.01)

(52) U.S. Cl.
CPC .............. *B29B 7/82* (2013.01); *B29B 7/183* (2013.01); *B29B 7/246* (2013.01); *B29B 7/263* (2013.01); *B29B 7/823* (2013.01); *B29B 7/826* (2013.01)

(58) Field of Classification Search
CPC ............ B29B 7/82; B29B 7/823; B29B 7/246
USPC .... 366/76.2, 76.6, 76.7, 76.93, 97, 145, 147
See application file for complete search history.

(56) References Cited

U.S. PATENT DOCUMENTS

| | | | | |
|---|---|---|---|---|
| 2,290,914 A | * | 7/1942 | Machlin | C09B 67/006 106/401 |
| 4,443,110 A | * | 4/1984 | den Otter | B01F 15/00201 366/144 |
| 4,476,686 A | * | 10/1984 | Madsen | A22C 5/00 366/144 |
| 5,061,078 A | * | 10/1991 | Yada | B29B 7/246 100/146 |
| 5,297,865 A | * | 3/1994 | Engel | B29B 7/7461 366/76.3 |
| 5,676,461 A | | 10/1997 | Edwards | |
| 5,865,535 A | | 2/1999 | Edwards | |
| 6,422,733 B1 | * | 7/2002 | Adams | B01F 15/0201 366/76.7 |
| 2006/0038325 A1 | * | 2/2006 | Ostrander | B29C 51/10 264/553 |

* cited by examiner

*Primary Examiner* — Abbas Rashid
(74) *Attorney, Agent, or Firm* — Rankin, Hill & Clark LLP

(57) ABSTRACT

A polymer processing system includes a mixer. The mixer includes at least one side wall and a bottom wall that cooperate to define a chamber. At least one side wall also defines a bore. The mixer also includes a pair of rotors that are disposed in the chamber and are rotatably received by the at least one side wall for mixing polymers. The mixer also includes at least one injector that at least partially extends through the bore of the at least one side wall. The polymer processing system also includes a ram that is movably connected to the mixer. The polymer processing system also includes a compressed air supply that is fluidly connected to the at least one injector to supply compressed air to the chamber through the at least one injector.

15 Claims, 5 Drawing Sheets

DYNAMIC COOLING

BACKGROUND

Internal or closed batch mixers have been commercially available for many years for mixing polymeric materials, such as plastics and rubber materials. The quality of the plastic or rubber products produced in the mixer can be influenced by mixing process parameters that are variable, such as fluctuations in the mixer temperature, the cooling water temperature, the material feed temperature, the ram pressure, the rotor speed, the time of mixing, the fill level, the speed of the fill, and the like.

During the processing of these polymeric materials, many times various ingredients, such as oil, fillers, curatives, antioxidants, etc., hereinafter additives, are added to the polymeric materials while in the mixer. These additives can be combined with the polymeric materials for a variety of reasons. For example, the additives may improve the stability of the polymeric material during processing. Alternatively, the additives may improve the performance characteristics of the polymeric material after processing is complete by providing, for example, increased resistance to UV degradation or improved wearing characteristics. However, some of these additives can only be added to the polymeric material in the mixer when the polymeric material is at a certain temperature. If the temperature of the polymeric material is too high, the effectiveness of the additive is impaired.

Thus, the polymeric material would have to be discharged from the mixer to allow the mixture to cool. Then, after cooling, the polymeric mixture was reintroduced into the mixer so that the various additives could be added to the polymeric mixture. As can be understood, this greatly increased the process time and cost for processing these compounds.

BRIEF DESCRIPTION

According to one aspect, a polymer processing system includes a mixer. The mixer includes at least one side wall and a bottom wall that cooperate to define a chamber. At least one side wall also defines a bore. The mixer also includes a pair of rotors that are disposed in the chamber and are rotatably received by the at least one side wall for mixing polymers. The mixer also includes at least one injector that at least partially extends through the bore of the at least one side wall. The polymer processing system also includes a ram that is movably connected to the mixer. The ram is selectively extendable into the chamber of the mixer so that the pair of rotors are between the ram and the bottom wall. The polymer processing system also includes a compressed air supply that is fluidly connected to the at least one injector to supply compressed air to the chamber through the at least one injector. The compressed air supply supplies the compressed air to the at least one injector at a pressure that is greater than a pressure of atmospheric air immediately surrounding an exterior of the mixer.

According to another aspect, a polymer processing system includes a mixer that includes at least one side wall and a bottom wall that cooperate to define a chamber, a pair of rotors that are disposed in the chamber to mix polymers, and at least one injector that is in fluid communication with the chamber. The polymer processing system also includes a ram that is selectively extendable into the chamber and an air chiller that cools air. The air chiller is fluidly connected to the at least one injector to supply the cooled air through the at least one injector into the chamber. The air chiller cools the air to a temperature that is less than a temperature of atmospheric air immediately surrounding an exterior of the mixer.

According to another aspect, a method of processing polymers includes the steps of adding the polymers into a mixer, extending a ram into the mixer, mixing the polymers in the mixer while the ram is extended into the mixer, retracting the ram from the mixer, and injecting pressurized air into the mixture after the ram is retracted. The pressurized air is injected into the mixer at a pressure that is greater than a pressure of atmospheric air immediately surrounding an exterior of the mixer to cool the polymer mixture.

DETAILED DESCRIPTION

The dynamic cooling system and process is described below as it applies to rubber compounding. However, the present application is not limited to rubber compounding and may be used to control the quality and batched batch uniformity of any polymer product that employs an internal mixer for mixing polymers and additives. For example, polymers such as polyamides, polyethylene, polypropylene, acrylonitrile butadiene styrene and polycarbonate may be compounded in an internal mixer that employs the dynamic cooling system and process as described hereinafter.

Figure 1:
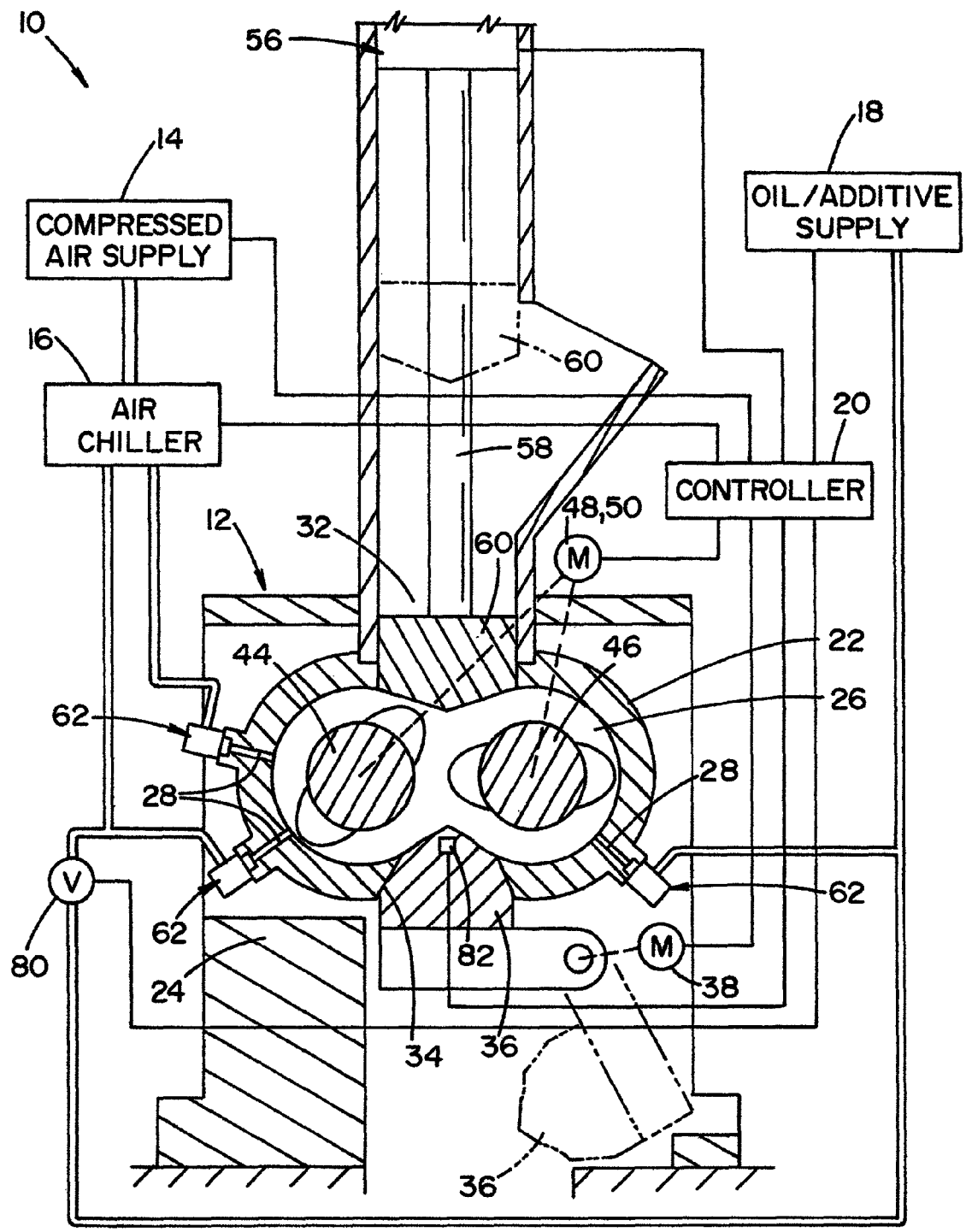
FIG. 1 is a partial sectional view of a mixer.
Figure 2:
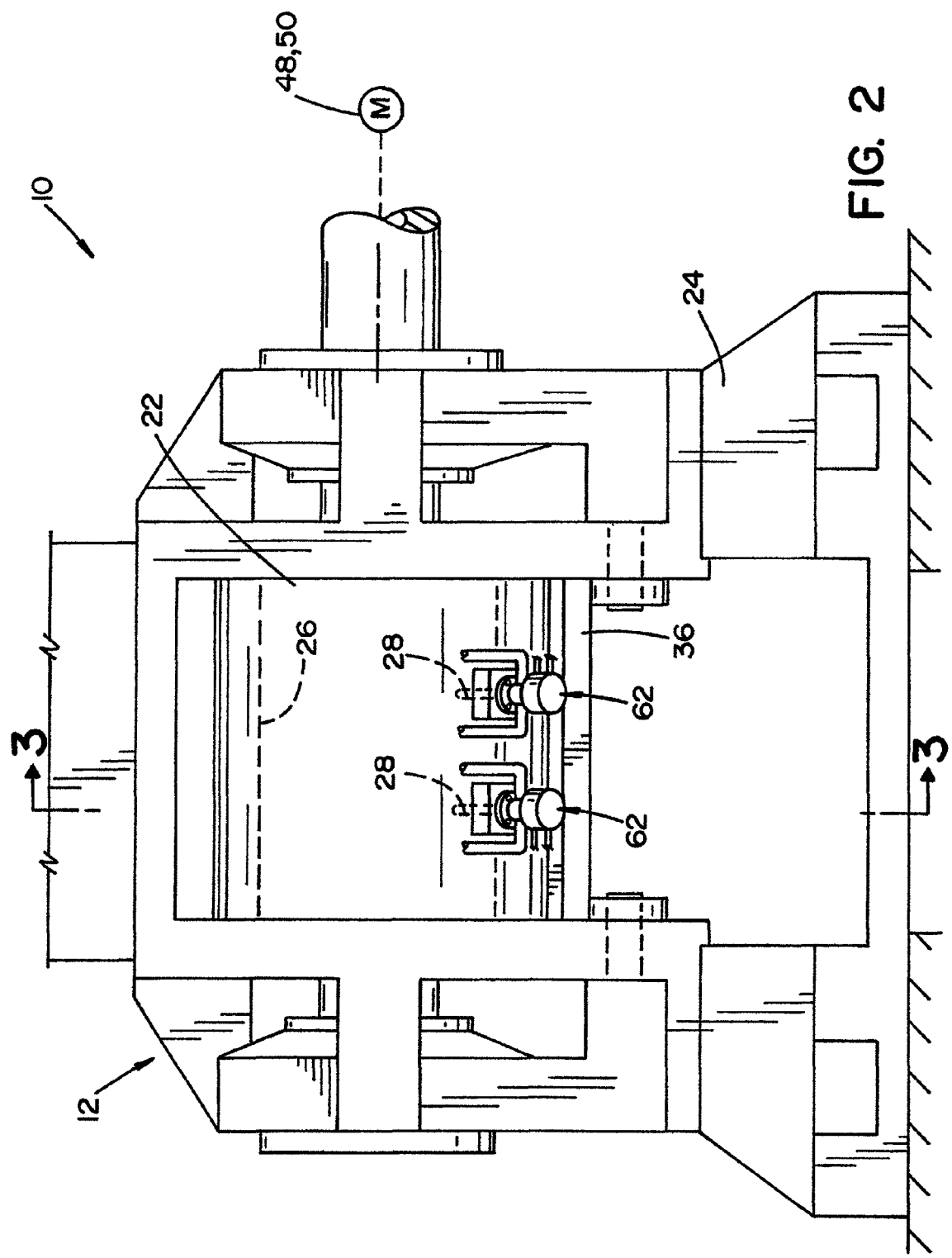
FIG. 2 is a partial elevation view of the mixer of FIG. 1.

With reference to FIG. 1, a polymer processing system 10 includes a mixer 12, a compressed air supply 14, an air chiller 16, an additive supply 18, and a controller 20. Initially, it is noted that FIG. 1 is a schematic view of the polymer processing system 10. It will be understood that the polymer processing system 10 could be arranged in a number of ways that are different from FIG. 1 and still accomplish the desired outcome.

The mixer 12 includes at least one side wall 22 and a bottom wall 24. The mixer 12 may be constructed of any number of materials that provide sufficient strength and durability for the processing of polymeric compounds. The at least one side wall 22 and the bottom wall 24 cooperate to form a chamber 26. As schematically shown in FIG. 1, the chamber 26 may have a "figure eight" shape in cross-section.

The at least one side wall 22 also defines at least one bore 28. The bore 28 extends from an interior face of the mixer 12 to an exterior face of the mixer 12. The bore 28 may be located in any number of locations along the at least one side wall 22. As will be described in more detail hereinafter, the bore 28 receives an injector 62.

Figure 3:
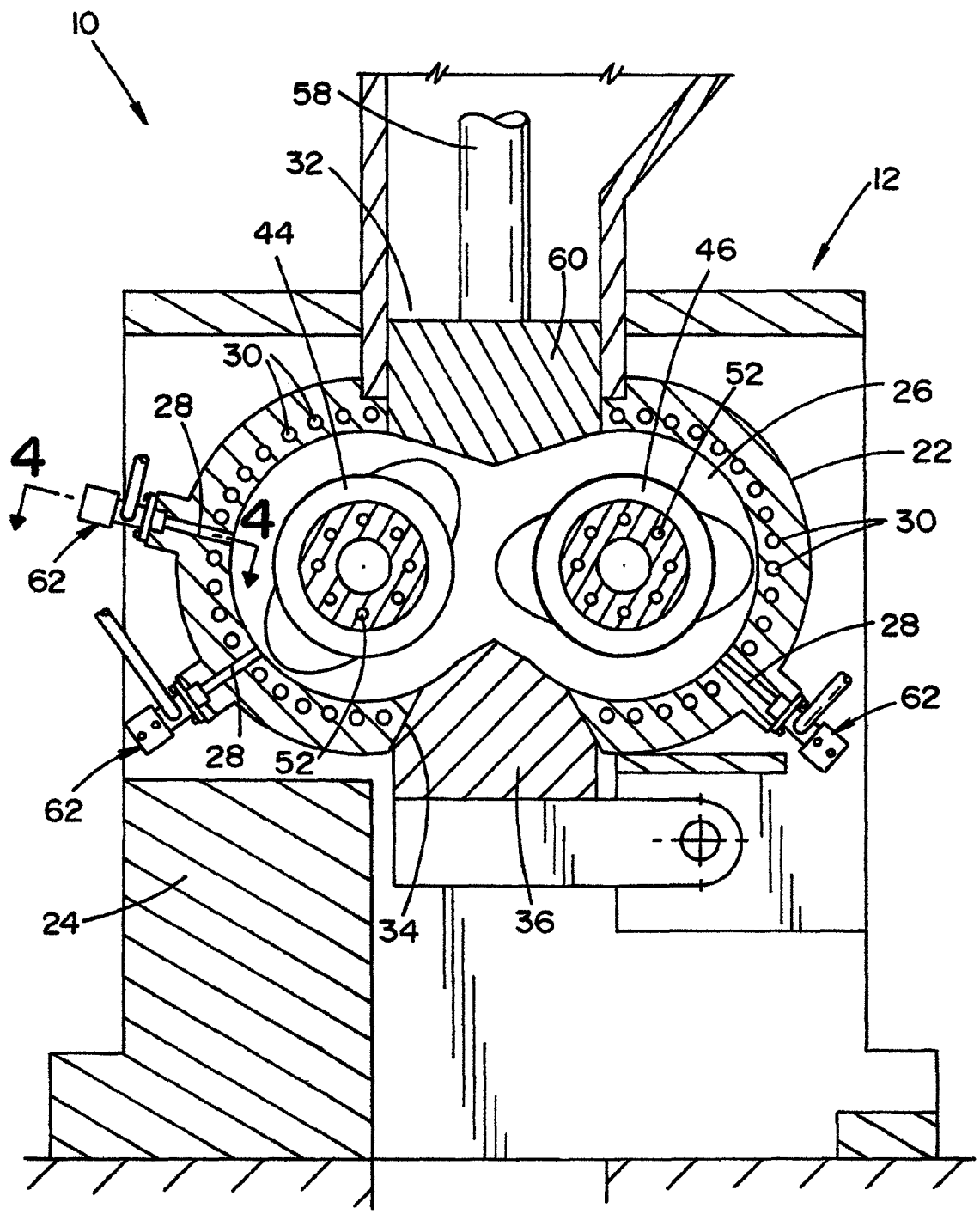
FIG. 3 is a partial sectional view of the mixer taken along lines 3-3 of FIG. 2.

With reference to FIG. 3, the sidewall 22 defines at least one passageway 30. The passageway 30 is fluidly isolated from the chamber 26. Although illustrated as having a circular cross-section, it will be understood that various shapes, sizes, and quantities of the passageway 30 are contemplated and possible. The passageway 30 allows for fluid to be circulated within the side wall 22 to assist in processing the polymeric material within the chamber 26. Specifically, warm coolant (not shown) may be passed through the passageway 30 to ensure that the interior face of the mixer 12 remains at a sufficient temperature to prevent sticking of the polymeric material to the side wall 22. Alternatively, cool coolant (not shown) may be passed through the passageway 30 in an attempt to reduce a temperature of the polymeric material in the mixer 12.

With reference once again to FIG. 1, the mixer 12 also defines a mixer inlet 32 and a mixer outlet 34. The mixer inlet 32 allows for the addition of the polymeric material to the mixer 12. The mixer inlet 32 is shown as being located near a top of the mixer 12. However, other locations for the mixer inlet 32 are possible. The mixer outlet 34 allows for the polymer material to be discharged from the mixer 12. The mixer 12 can also include an outlet door 36 that selectively seals the mixer outlet 34. Additionally, an outlet door motor 38 is operably connected to the outlet door 36 so as to rotate the outlet door 36 between an open position in which polymeric material in the chamber 26 may be discharged from the mixer 12 and a closed position in which the polymeric material in the chamber 26 is prevented from being discharged from the mixer 12. As will be appreciated, any number of mechanisms could be used to actuate the outlet door 36 without departing from the scope of the present application. Further, as will be described in more detail hereinafter, the outlet door motor 28, and hence the outlet door 36, are controlled by the controller 20. For reference, FIG. 1 shows the outlet door 36 in the open position in phantom lines and in the closed position in solid lines.

As shown in FIG. 1, the mixer 12 also includes a pair of rotors 44, 46 of traditional construction. The rotors 44, 46 can be rotatably received by the at least one side wall 22. The rotors 44, 46 are mounted for rotation about parallel axes that lie in a horizontal plane and are driven by rotor motors 48, 50. The rotors 44, 46 can be rotated in opposite directions and may have the same or slightly different rotational speeds. The speed of the rotors 44, 46 is based upon a rotational speed of the rotor motors 48, 50. As will be described in more detail hereinafter, the rotor motors 48, 50 are controlled by the controller 20. With reference to FIG. 3, the rotors 44, 46 may define at least one rotor passageway 52. The rotor passageway 52 may function in a similar manner to the passageway 30 of the side wall 22. Thus, for brevity an explanation is omitted.

With reference once again to FIG. 1, a ram 56 can be movably connected to the mixer 12. The ram 56 may include a ram shaft 58 and a ram head 60. The ram 56 is movable between an extended position in which the ram head 60 is at least partially received within the chamber 26 and a retracted position in which the ram head 60 is not received at least partially within the chamber 26. The ram 56, and in particular the ram head 60, exerts pressure on the polymeric material in the chamber 26. The ram head 60 may exert pressure on the polymeric material in the chamber 26 even while the rotors 44, 46 rotate. As is considered apparent, the pressure exerted by the ram 56 on the polymeric materials has an influence on the mixing in the chamber 26. The position of the ram 56, and hence the ram head 60, is controlled by the controller 20 as will be described in more detail hereinafter.

As shown in FIGS. 1 and 3, an injector 62 at least partially extends through the bore 28 of the side wall 22. Although illustrated as being positioned at an inclined angle with respect to the horizon, it is understood that the injector 62 could be oriented in any number of orientations to discharge fluid into the chamber 26. As shown, the injector 62 is fluidly connected to the compressed air supply 14 and optionally to the air chiller 16. However, the injector 62 is fluently distinct and separate from the passageway 30 of the side wall 22 and also of the rotor passageway 52. Therefore, any fluid that is injected from the injector 62 is fluidly isolated from any fluid in either the passageway 30 of the side wall 22 or the rotor passageway 52.

Figure 4:
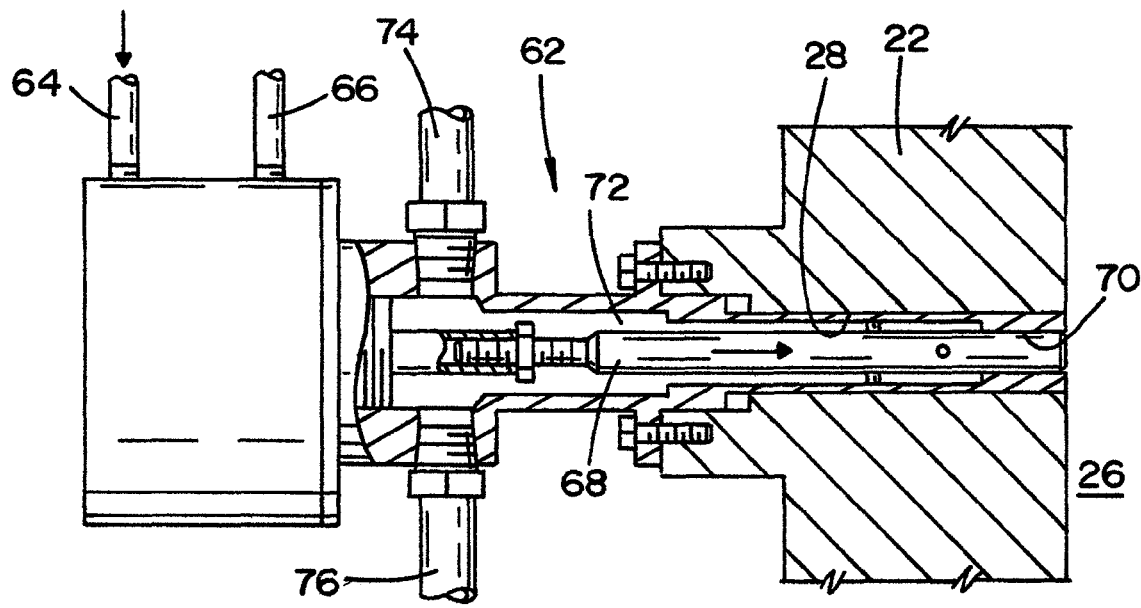
FIG. 4 is a sectional view of an injector taken along lines 4-4 of FIG. 3 with the injector in the closed position.

The injector 62 defines an open position and a closed position. In particular, the closed position does not allow fluid communication between the compressed air supply 12 or the additive supply 18 and the chamber 26 and the open position allows fluid communication between the compressed air supply 14 and the additive supply 18 and the chamber 26. As illustrated in FIG. 4, the injector 62 is shown in the closed position. The injector 62 includes a first port 64, a second port 66, and a piston, which is not shown. When fluid is supplied to the first port 64 of the injector 62, the piston causes an injector shaft 68 of the injector 62 to be biased towards the right of FIG. 4. When the injector shaft 68 is biased to the right, the injector shaft 68 makes contact with a seat 70. Contact with the seat 70 prevents any fluids from exiting through an injector orifice 72, thereby preventing the aforementioned fluid communication between the compressed air supply 12 or the additive supply 18 and the chamber 26.

Figure 5:
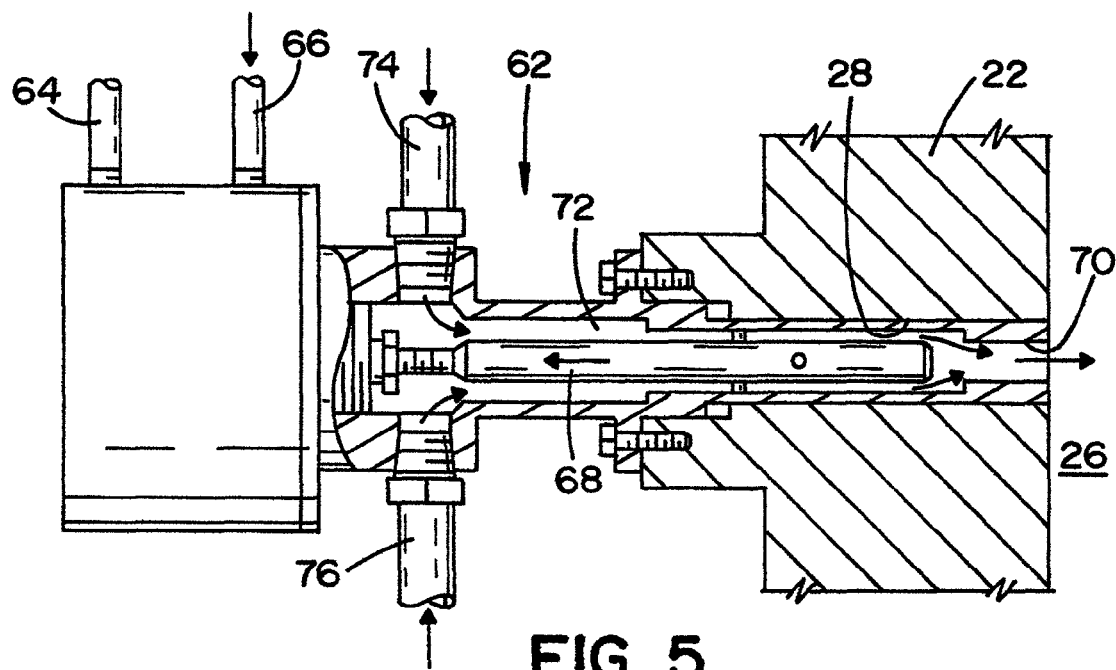
FIG. 5 is a sectional view of the injector taken along lines 4-4 of FIG. 3 with the injector in the open position.

Alternatively, with reference to FIG. 5, whenever fluid is supplied to the second port 66 of the injector 62, the injector shaft 68 is biased toward the left of FIG. 5. This causes the injector shaft 68 to not contact the seat 70. Accordingly, fluid can exit the injector 62 through the injector orifice 72, thereby allowing the aforementioned fluid communication between the compressed air supply 12 and/or the additive supply 18 and the chamber 26. As will be appreciated, any number of devices could be used to selectively permit the introduction of fluid into the chamber 26.

The injector 62 can also include an additive inlet 74 and a compressed air supply inlet 76. The additive inlet 74 is fluidly connected to the additive supply 18 and the compressed air supply inlet 76 is fluidly connected to the compressed air supply 14. Thus, the injector orifice 72 fluidly connects the additive supply 18 and the compressed air supply 14 to the chamber 26. It is noted that the injector 62 may include either the additive inlet 74 or the compressed air supply inlet 76, or both. It is also noted that the injector 62 may be disposed at a variety of locations for fluid communication with the chamber 26. It will be understood that the illustrated embodiments merely offer examples for placement of the injectors 62.

With reference once again to FIG. 1, the compressed air supply 14 is shown. Although illustrated schematically, it is understood that the compressed air supply 14 can be comprised of an air compressor and a storage or receiver tank. For example, the air compressor could be 50 horsepower or greater and the tank could have a capacity of 140 gallons or greater. The compressed air supply 14 supplies compressed air to the chamber 26 at a pressure that is greater than a pressure of atmospheric air in an area immediately surrounding an exterior of the mixer 12. In fact, the compressed air supply 14 could supply compressed air to the chamber 26 at a pressure that is at least 80 pounds per square inch. As will be described in more detail hereinafter, the compressed air supply 14 is controlled by the controller 20.

With continued reference to FIG. 1, the air chiller 16 is shown. The air chiller 16 is fluidly located between the compressed air supply 14 and the at least one injector 62. The air chiller 16 is able to reduce the temperature of the compressed air from the compressed air supply 14 to a temperature that is less than atmospheric air that is immediately surrounding an exterior of the mixer 12. Further, the air chiller 16 is able to lower the temperature of the air to a temperature that is less than a temperature of the polymer mixture inside of the chamber 26. For example, the air chiller 16 is able to reduce the air to a temperature that is less than 50 degrees Fahrenheit. It will be understood that the polymer mixture in the chamber 26 may be sufficiently cooled by merely being supplied with air that has been cooled by the air chiller 16 or merely being supplied with air from the compressed air supply 14 or by being supplied with air that is from the compressed air supply 14 and the air chiller 16. It will also be understood that the air from the air chiller 16 would have a pressure that is greater than a pressure of atmospheric air immediately surrounding an exterior of the mixer 12.

With continued reference to FIG. 1, the additive supply 18 is schematically shown. The additive supply 18 may be of a tank-like construction and may house various types of additives. For example, the additive supply 18 may contain oil. However, it will be understood that various other types of additives could be contained within the additive supply 18. As previously noted, the additives may improve the stability of the polymeric material during processing and/or may improve the performance characteristics of the polymeric material after processing.

The additives may provide, for example, increased resistance to UV degradation or improved wearing characteristics to the polymeric material. Some of these additives can only be added to the polymeric material in the mixer 12 when the polymeric material is below a certain temperature. Unfortunately, the temperature of the polymeric material in a traditional mixer is typically greater than the required certain temperature. As will be appreciated, the traditionally mixer retains heat for a long period of time. Thus, with the traditional mixer, the polymeric material is discharged to a location away from the mixer so that cooling of the polymeric material can occur. After the polymeric material has been sufficiently cooled, it is then reintroduced into the mixer. Then, after adequate further mixing, the additives are introduced into the chamber.

With the addition of the compressed air supply 14 and/or the air chiller 16, the temperature of the polymeric material while in the chamber 26 can be quickly and efficiently lowered to the certain temperature so that the additives can be added to the polymeric mixture in the mixer 12. This eliminates the need for the polymeric material to be discharged from the mixer 12, cooled outside of the mixer, and then reintroduced into the mixer prior to addition of the additives. Accordingly, process time is decreased, quality is ensured, and processing costs are lowered.

With continued attention to FIG. 1, an additive supply valve 80 is also shown. The additive supply valve 80 is fluidly disposed between the additive supply 18 and the injector 62. This valve 80 allows the additive from the additive supply 18 to be selectively dispensed to the chamber 26. As will be described in more detail hereinafter, the additive supply valve 80 is connected to and controlled by the controller 20. It will be understood that alternative arrangements for supplying the additives through the injector 62 are possible and contemplated.

As shown in FIG. 1, a temperature sensor 82 is disposed at least partially within the chamber 26. The temperature sensor 82 measures the temperature of the materials that are within the chamber 26 and is connected to the controller 20. The temperature sensor 82 could be of a contact or non-contact type construction.

As illustrated in FIG. 1, the controller 20 is connected to the compressed air supply 14, the air chiller 16, the outlet door motor 38, the rotor motors 48, 50, the ram 56, the additive supply valve 80, and the temperature sensor 82. The controller 20 may be any number of central processing units or programmable logic controllers. Further, shown as being connected to the various components with wires, it will be understood that the controller 20 could be interfaced with the other components through a variety of other connection methods including, for example, wireless communication.

By connecting the controller 20 to the compressed air supply 14, and the air chiller 16, compressed and/or chiller air may be selectively supplied to the chamber 26 of the mixer 12 through the at least one injector 62. Thus, the controller 20 can control operation of the compressed air supply 14. For example, the controller 20 could vary operation the compressed air supply 14 so as to adjust the pressure and volume of the air that is supplied to the chamber 26 through the injector 62. Further, the controller 20 can vary operation of the air chiller 16 so as to adjust the temperature and volume of the air that is supplied to the chamber 26 through the injector 62.

As previously described, the controller 20 is connected to the outlet door motor 38. Thus, outlet door motor 38, and hence the outlet door 36, can be controlled by the controller 20. In particular, the outlet door motor 38 can be instructed by the controller 20 to rotate in a clockwise or counterclockwise direction. Therefore, the outlet door motor 38 can actuate the outlet door 36 to open and close the door 36. This allows for the polymeric material within the chamber 26 to be selectively retained or discharged from the mixer 12.

The controller 20 also controls the speed and rotational direction of the rotor motors 48, 50. Thus, the rotors 44, 46 may independently be rotated in the clockwise and counterclockwise directions. This ensures that the polymeric material in the chamber 26 of the mixer 12 is adequately and sufficiently mixed so as to produce the best possible product.

By connecting the controller 20 to the ram 56, the ram shaft 58 and consequently the ram head 60 can be extended or retracted. Thus, the controller 20 can instruct the ram 56 to extend the ram shaft 58 toward the rotors 44, 46 so that the ram head 60 is disposed at least partially within the chamber 26 of the mixer 12. It is noted that the ram head 60 can be shaped so as to complement the profile of the rotors 44, 46. Thus, the ram head 60 may be extended into the chamber 26 so as to nearly touch the rotors 44, 46 while the rotors 44, 46 are being rotated by the rotor motors 48, 50. The controller 20 can also control the ram 56 so as to retract the ram shaft 58, and hence the ram head 60, from the chamber 26 of the mixer 12 so that the ram head 60 is not within the chamber 60. The ram 56 will typically be in the retracted position any time that air is injected through the injector 62 into the chamber 26.

As the controller 20 is connected to the additive supply valve 80, the additive which is located within the additive supply 18 can be selectively discharged into the chamber 26 through the injector 62 into the chamber 26. The controller 20 can control the additive supply valve 80 so as to limit an amount of the additive that is introduced into the chamber 60 through the injector 62.

Connection of the controller 20 to the injector 62 allows for further control of any fluids that are to be introduced into the chamber 26 for direct contact with the polymeric material. As noted hereinbefore, when fluid is supplied to the first port 64 and the second port 66 selectively communication between the compressed air supply 14, the air chiller 16, the additive supply 18 and the chamber 26 can occur. Thus, the controller 20 can effectively and efficiently control what fluids are introduced into the chamber 26 for direct contact with the polymeric materials located within.

The controller 20 is also connected to the temperature sensor 82. Thus, the temperature of the polymeric mixture within the chamber 26 can be monitored. This monitoring can be continuous or at uniform or non-uniform intervals. By monitoring the temperature of the polymeric materials in the mixer 12, the quality of the subsequent product can be ensured and process times can be properly tailored in view of the cooling provided by the compressed air supply 14 and/or the air chiller 16.

Figure 6:
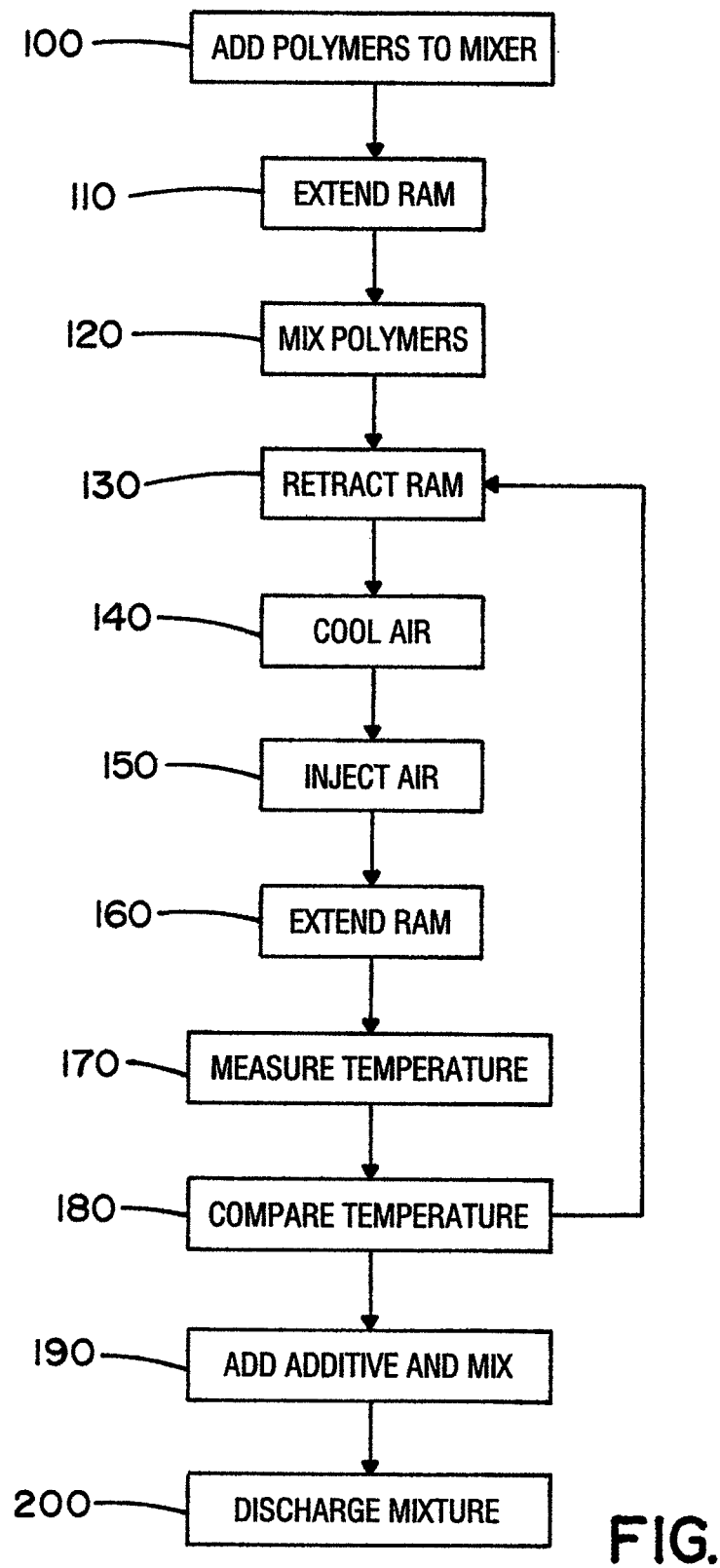
FIG. 6 is a flowchart of a method of processing polymers.

With reference to FIG. 6, a method of processing polymers will now be described. In 100, polymers are added to the mixer 12. In 110, the ram 56 is extended into the chamber 26 of the mixer 12. In 120, the polymers are mixed in the mixer 12 while the ram 56 is extended into the chamber 26 of the mixer 12. In 130, the ram 56 is retracted from the chamber 26 of the mixer 12. In 140, pressurized air is optionally cooled. In 150, pressurized air is injected into the mixer 12 after the ram 56 is retracted. The pressurized air is injected into the chamber 26 of the mixer 12 at a pressure that is greater than a pressure of atmospheric air that immediately surrounds an exterior of the mixer 12.

Thus, this action cools the polymer mixture that is within the chamber 26. In 160, the ram 56 is extended into the chamber 26 of the mixer 12 after the injection of the pressurized air into the mixer 12 has stopped. In 170, a temperature of the polymer mixture within the chamber 26 of the mixer 12 is measured. In 180, the measured temperature of the polymer mixture is compared to a predetermined value. In 190, if the measured temperature is less than the predetermined value, at least one additive is added to the mixer 12 and the polymer mixture is mixed. Alternatively, if the temperature is greater than the predetermined value, 130, 150, 160, 170, and 180 are repeated in that order until the measured temperature is less than the predetermined value. In 200, the polymer mixture is discharged from the mixer 12.

While, for purposes of simplicity of explanation, the method has steps shown and described as executing serially, it is understood and appreciated that the present description is not limited by the illustrated order, and some steps could occur in different orders and/or concurrently with other steps from that shown and described herein.

It will be appreciated that variations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A polymer processing system, comprising:
a mixer including
at least one side wall and a bottom wall that cooperate to define a mixing chamber, the at least one side wall also defining a bore,
a pair of rotors disposed in the mixing chamber and rotatably received by the at least one side wall for mixing polymers, and
at least one injector that at least partially extends through the bore of the at least one side wall into the mixing chamber, the at least one injector defining an injector orifice, the at least one injector including:
a movable injector shaft that is received in the injector orifice wherein the injector shaft selectively allows fluid communication between the injector orifice and the mixing chamber, and
an additive inlet received on a first side of the injector orifice to fluidly connect an additive supply to the injector orifice;
a ram movably connected to the mixer, the ram including a ram shaft and a ram head, wherein the ram is movable between an extended position in which the ram head is at least partially received within the mixing chamber and a retracted position in which the ram head is not received at least partially within the mixing chamber;
a compressed air supply fluidly connected to the at least one injector to supply compressed air to the mixing chamber through the at least one injector, wherein the compressed air supply supplies the compressed air to the at least one injector at a pressure that is greater than a pressure of atmospheric air immediately surrounding an exterior of the mixer; and
an air chiller fluidly disposed between the compressed air supply and the at least one injector, wherein the at least one injector includes a compressed air supply inlet that is received on a second side of the injector orifice that is opposite the first side to fluidly connect the compressed air supply to the injector orifice, wherein the air chiller is fluidly connected to the at least one injector to supply cooled air through the at least one side wall into the mixing chamber to cool the polymers, and wherein the air chiller cools the cooled air to a temperature that is less than a temperature of the atmospheric air immediately surrounding the exterior of the mixer.

2. The polymer processing system of claim 1, further comprising:
a controller that controls the compressed air supply to supply the compressed air to the mixing chamber through the at least one injector.

3. The polymer processing system of claim 1, the at least one side wall defining at least one side wall passageway that receives fluid, the at least one side wall passageway being fluidly isolated from the compressed air supply.

4. The polymer processing system of claim 1, wherein the compressed air supply supplies the compressed air to the at least one injector at at least eighty pounds per square inch.

5. The polymer processing system of claim 1, further comprising:
a temperature sensor disposed at least partially within the mixing chamber so as to measure a temperature of the polymers in the mixing chamber; wherein the air chiller reduces a temperature of the compressed air that is supplied to the at least one injector to a temperature that is less than the temperature of the polymers in the mixing chamber.

6. The polymer processing system of claim 1, the mixer further defining a mixer inlet through which the ram extends and through which the polymers are introduced into the mixer and a mixer outlet through which the polymers are discharged from the mixer, wherein the at least one injector is fluidly distinct and separate from the mixer inlet and the mixer outlet.

7. The polymer processing system of claim 1, wherein the air chiller reduces the temperature of the air that is supplied to the at least one injector to approximately 50 degrees Fahrenheit or less.

8. The polymer processing system of claim 1, further comprising:
   a controller configured to control the ram so that the ram is in the retracted position when the cooled air is supplied from the at least one injector to the mixing chamber.

9. A polymer processing system, comprising:
   a mixer including
      at least one side wall and a bottom wall that cooperate to define a mixing chamber, the at least one side wall also defining a bore,
      a pair of rotors disposed in the mixing chamber and rotatably received by the at least one side wall for mixing polymers, and
      at least one injector that at least partially extends through the bore of the at least one side wall;
   a ram movably connected to the mixer, the ram including a ram shaft and a ram head, wherein the ram is movable between an extended position in which the ram head is at least partially received within the mixing chamber and a retracted position in which the ram head is not received at least partially within the mixing chamber;
   a compressed air supply fluidly connected to the at least one injector to supply compressed air to the mixing chamber through the at least one injector, wherein the compressed air supply supplies the compressed air to the at least one injector at a pressure that is greater than a pressure of atmospheric air immediately surrounding an exterior of the mixer;
   an air chiller fluidly disposed between the compressed air supply and the at least one injector to supply cooled air through the at least one side wall into the mixing chamber to cool the polymers, wherein the air chiller cools the cooled air to a temperature that is less than a temperature of the atmospheric air immediately surrounding the exterior of the mixer; and
   a central processing unit configured to control the ram so that the ram is in the retracted position when the cooled air is supplied from the at least one injector to the mixing chamber.

10. The polymer processing system of claim 9, further comprising:
    an additive supply that contains polymer additives, wherein the at least one injector includes an additive inlet that is fluidly connected to the additive supply, a compressed air supply inlet that is fluidly connected to the compressed air supply, and an injector orifice that fluidly connects the additive inlet and the compressed air supply inlet to the mixing chamber.

11. The polymer processing system of claim 9, the at least one side, wall defining at least one side wall passageway that receives fluid, the at least one side wall passageway being fluidly isolated from the compressed air supply.

12. The polymer processing system of claim 9, wherein the compressed air supply supplies the compressed air to the at least one injector at at least eighty pounds per square inch.

13. The polymer processing system of claim 9, further comprising:
    a temperature sensor disposed at least partially within the mixing chamber so as to measure a temperature of the polymers in the mixing chamber; wherein the air chiller reduces a temperature of the compressed air that is supplied to the at least one injector to a temperature that is less than the temperature of the polymers in the mixing chamber.

14. The polymer processing system of claim 9, the mixing chamber further defining a mixing chamber inlet through which the ram extends and through which the polymers are introduced into the mixing chamber and a mixing chamber outlet through which the polymers are discharged from the mixing chamber, wherein the at least one injector is fluidly distinct and separate from the mixing chamber inlet and the mixing chamber outlet.

15. The polymer processing system of claim 9, wherein the air chiller reduces the temperature of the air that is supplied to the at least one injector to approximately 50 degrees Fahrenheit or less.

* * * * *